United States Patent
Medina, III et al.

(10) Patent No.: US 8,019,629 B1
(45) Date of Patent: Sep. 13, 2011

(54) SYSTEMS AND METHODS FOR AUTOMOBILE ACCIDENT CLAIMS INITIATION

(75) Inventors: Reynaldo Medina, III, San Antonio, TX (US); Charles L. Oakes, III, Boerne, TX (US); Bradly Jay Billman, San Antonio, TX (US); Michael Patrick Bueche, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 408 days.

(21) Appl. No.: 12/098,667

(22) Filed: Apr. 7, 2008

(51) Int. Cl.
G06Q 40/00 (2006.01)
(52) U.S. Cl. .......................................................... 705/4
(58) Field of Classification Search ........................ 705/4
See application file for complete search history.

(56) References Cited

U.S. PATENT DOCUMENTS

| | | | |
|---|---|---|---|
| 4,589,132 A | 5/1986 | Botbol et al. | |
| 6,141,611 A | 10/2000 | Mackey et al. | |
| 6,163,338 A | 12/2000 | Johnson et al. | |
| 6,684,137 B2 | 1/2004 | Takagi et al. | |
| 6,694,234 B2 | 2/2004 | Lockwood et al. | 701/29 |
| 7,239,877 B2 | 7/2007 | Corneille et al. | 455/456.3 |
| 7,313,759 B2 | 12/2007 | Sinisi | 715/234 |
| 2002/0035488 A1 | 3/2002 | Aquila et al. | 705/4 |
| 2002/0055861 A1* | 5/2002 | King et al. | 705/4 |
| 2002/0063637 A1 | 5/2002 | Eida et al. | |
| 2002/0181956 A1 | 12/2002 | Simpson, III | |
| 2003/0125853 A1 | 7/2003 | Takagi et al. | |
| 2003/0233261 A1 | 12/2003 | Kawahara et al. | |
| 2005/0078195 A1 | 4/2005 | VanWagner | |
| 2007/0200691 A1 | 8/2007 | Lam et al. | |
| 2008/0235040 A1* | 9/2008 | Ratliff et al. | 705/1 |

FOREIGN PATENT DOCUMENTS

| | | | |
|---|---|---|---|
| JP | 200557343 | * | 8/2003 |
| JP | 2005057343 | | 3/2005 |

OTHER PUBLICATIONS

Translation of JP200557343, Image Data Registration Device and Method.*
Rachel, K., "Mobilizing the Insurance Industry," Wireless in Action, 2001, 1-3.
"U.S. Appl. No. 12/098,562, Non-Final Office Action mailed May 6, 2010", 9 pgs.
"U.S. Appl. No. 12/098,562, Preliminary Amendment mailed Apr. 30, 2008", 37 pgs.
"U.S. Appl. No. 12/098,589, Non-Final Office Action mailed Jun. 3, 2010", 9 pgs.

(Continued)

*Primary Examiner* — Lindsay M Maguire
*Assistant Examiner* — Hao Fu
(74) *Attorney, Agent, or Firm* — Schwegman, Lundberg & Woessner, P.A.

(57) ABSTRACT

Automobile accident claims initiation systems and methods are described. An insured driver may initiate a claim by operating a mobile device. The system provides automated inquiries to the driver through the mobile device. The driver provides responses to the inquiries using the mobile device. The driver may provide images and audio data, as well as personal information and information on the parties and vehicles involved in the accident. The system may automatically arrange for services such as a rental car or a tow truck. The system may provide claim information, such as a claim number to the driver by transmitting information to the mobile device.

21 Claims, 3 Drawing Sheets

OTHER PUBLICATIONS

"U.S. Appl. No. 12/098,589, Preliminary Amendment mailed Apr. 30, 2008", 37 pgs.
Application U.S. Appl. No. 12/099,447, Final Office Action mailed Jan. 20, 2011, 14 pgs.
Application U.S. Appl. No. 12/099,447, Non-Final Office Action mailed Apr. 28, 2011, 13 pgs.
Application U.S. Appl. No. 12/099,447, Non-Final Office Action mailed May 12, 2010, 10 pgs.
Application U.S. Appl. No. 12/099,447, Response filed Apr. 19, 2011 to Final Office Action mailed Jan. 20, 2011, 13 pgs.
Application U.S. Appl. No. 12/099,447, Response filed Nov. 11, 2010 to Non-Final Office Action mailed May 12, 2010, 12 pgs.
Gorgorin, Cristian, et al., "An integrated vehicular and networking simulator for vehicular adhoc networks", [Online]. Retrieved from the Internet: <URL: http://citeseer.ist.psu.edu/viewdoc/summary?doi=10.1.1.64.9461>, 8 pgs.

* cited by examiner

SYSTEMS AND METHODS FOR AUTOMOBILE ACCIDENT CLAIMS INITIATION

CROSS-REFERENCE TO RELATED APPLICATIONS

This application is related by subject matter to the subject matter disclosed in the following commonly assigned applications, the entirety of which are hereby incorporated by reference herein: U.S. patent application Ser. No. 12/098,562, and U.S. patent application Ser. No. 12/098,589, each filed on Apr. 7, 2008 and each entitled "Systems and Methods for Automobile Accident Claims Initiation." This application is also related by subject matter to the subject matter disclosed in the following commonly assigned applications: U.S. patent application Ser. No. 12/099,414, U.S. patent application Ser. No. 12/099,447, and U.S. patent application Ser. No. 12/099,477, each filed on Apr. 7, 2008 and each entitled "Systems and Methods for Recording Accident Information."

BACKGROUND

An automobile accident can be a very stressful situation. Even if no one is hurt, being in an accident can be very disconcerting for the people involved. However, if someone involved in an accident needs to file an insurance claim, it is best to quickly collect as much information as possible in order to properly submit the claim. If a claimant does not gather at least some information at the scene of the accident, information may later be unavailable or forgotten. Thus, a claimant often attempts to quickly and accurately collect information for an insurance claim at the scene of an accident while they are still under the stress of the accident. A claimant may also desire that such information be provided to an insurer as quickly as possible so that the claim process can be expedited. This may especially be the case when a claimant's vehicle may not be drivable due to the accident. Such a claimant may need a rental car or tow truck as soon as possible, and may wish to begin the claim process so that the claimant's vehicle is returned to service as soon as possible.

SUMMARY

Systems and method are provided for automobile accident claims initiation. In one non-limiting example, an insured driver may request the initiation of a claim by using a mobile device. The mobile device may be preconfigured with information about the insured which may be transmitted with the claim initiation request. The mobile device may also generate or obtain information itself, such as location or timestamp information, which may also be transmitted with the claim initiation request. The claim initiation request may be used by the system to generate further inquiries, which are sent to the insured through the mobile device. The insured may provide responses to the inquiries which may include images, audio data, as well as information about the accident, such as identification information about the parties and vehicles involved and witness information. Such data may be gathered on the mobile device using mobile device components.

Data provided by the insured may be analyzed for verification or to derive further information. In another non-limiting example, in response to information received from the insured, an automobile accident claims initiation system may arrange for services for the insured. Such services may be provided automatically. A claim number and other claim related information may be provided to the insured.

BRIEF DESCRIPTION OF THE DRAWINGS

The foregoing summary and the following detailed description of preferred embodiments are better understood when read in conjunction with the appended drawings. For the purposes of illustration, there is shown in the drawings exemplary embodiments; however, the subject matter is not limited to the specific methods and instrumentalities disclosed. In the drawings.

DETAILED DESCRIPTION

The subject matter of the described embodiments is described with specificity to meet statutory requirements. However, the description itself is not intended to limit the scope of this patent. Rather, it is contemplated that the claimed subject matter might also be embodied in other ways, to include different steps or elements similar to the ones described in this document, in conjunction with other present or future technologies.

When involved in an accident, an insured driver may want to submit a claim as soon as possible. The insured may wish to get his or her vehicle repaired as quickly as possible, and may need to arrange for a rental car and/or a tow truck. Unfortunately, the stress of being involved in an accident may make it more difficult for the insured to gather accurate and complete information. Even if the insured is not injured, the psychological trauma of the accident may prevent the insured from thinking clearly or taking the appropriate steps to gather important information at the accident scene. In one embodiment, a system is provided that facilitates the collection of insurance claim data.

Figure 1:
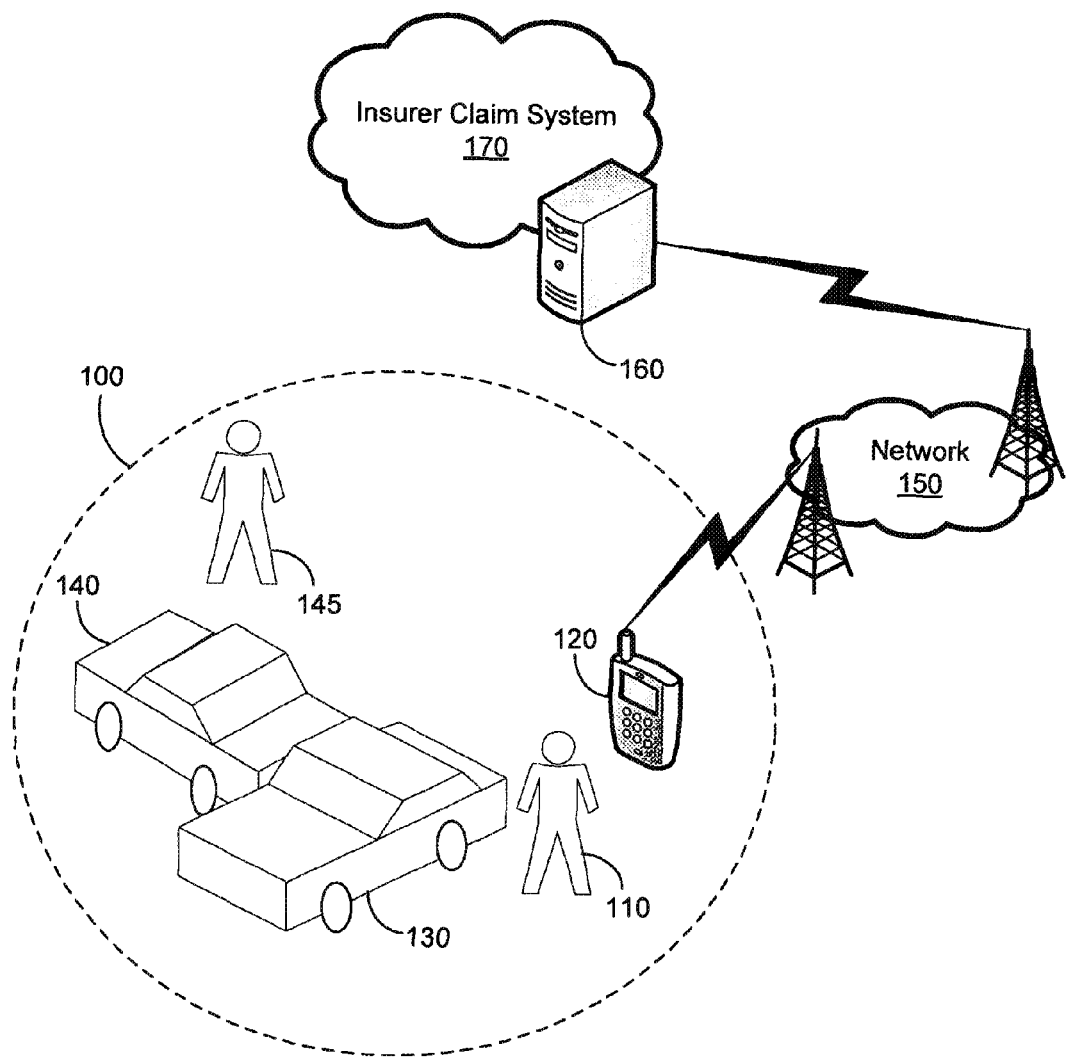
FIG. 1 is a graphical representation of an exemplary, non-limiting automobile accident claims initiation system and an accident scene.

FIG. 1 illustrates a non-limiting diagram of an exemplary automobile accident claims initiation system. Insured 110 may be involved in an accident at accident scene 100. Insured 110 may be any person who operates, owns, leases, or otherwise controls a vehicle and has insurance on the vehicle, or any other person who may submit an insurance claim. Accident scene 100 may be any location, road, intersection, or any other geographical area where an accident involving one or more vehicles may take place. Insured 110 may be the operator of vehicle 130. Vehicle 130 may be any vehicle that is capable of transporting passengers, including, but not limited to, a car, a truck, a van, a minivan, a sport-utility vehicle, a motorcycle, a scooter, a recreational vehicle, a boat, or a tractor.

Driver 145 may be the other party involved in the accident, and may be the operator of vehicle 140. Driver 145 may be any person capable of operating any vehicle. Vehicle 140 may be any vehicle that is capable of transporting passengers, including, but not limited to, a car, a truck, a van, a minivan, a sport-utility vehicle, a motorcycle, a scooter, a recreational vehicle, a boat, or a tractor.

Insured 110 is operating mobile device 120. Mobile device 120 may be any device that is capable of operating on a wireless mobile communications network and that communicates with other devices using, at least in part, a wireless network. Examples of such devices include, but are not limited to, mobile telephones, mobile computers, personal data assistants ("PDAs"), navigation systems, vehicle communication systems, and wirelessly networked computers. Any device which can communicate with any other device by communicating, at least in part, wirelessly through a wireless network is contemplated as being within the scope of the present disclosure. Mobile device 120 may include a camera component that is capable of capturing and storing images. Mobile device 120 may also include an audio component that is capable of capturing and storing audio data. Mobile device 120 may include other components capable of acquiring, storing, and/or processing any form or type of data. Any such component may be integrated into the housing of mobile device 120 or may be communicatively connected, wirelessly or by wire, to mobile device 120. All such components are contemplated as within the scope of the present disclosure.

Mobile device 120 may be a device purchased by insured 110 for personal use. Alternatively, mobile device 120 may be provided for insurance related activities. For example, an insurer, such as the operator of insurer claim system 170, may have provided mobile device 120 to insured 110 when insured 110 obtained insured's 110 insurance policy or requested such a device. By providing such a device, an insurer may obtain more complete and accurate information about an accident, and reduce opportunities for fraud and/or mistakes in claim processing.

Mobile device 120 may include global positioning system ("GPS") components and/or software, enabling it to communicate with GPS satellites and determine its own location, speed, direction, and the current time. Mobile device 120 may be constructed such that it can communicate GPS-derived location and direction information to a telecommunications network, other devices, and/or insured 110. Mobile device 120 may include other means of determining its own location, speed, and/or direction, including receiving such information from a telecommunications network, or deriving such information from the use of technologies well known to those skilled in the art that utilize one or more cellular towers and analysis of signal strength, time delays, angles of arrival, or other measurements to determine a device's location. Such locating means include, but are not limited to, triangulation and hyperbolic fixing schemes. Such locating means may use time delays between mobile device 120 and two or more cellular towers to determine a relatively precise location for mobile device 120. The various means and methods of locating a device using cellular network measurements, including the use of time delay and/or signal strength to determine the location, speed, and/or direction of a mobile device, are well known to those skilled in the art, and therefore will not be recited herein. Any means of determining a mobile device's current or past location, speed, and/or direction are contemplated as within the scope of the present disclosure.

Mobile device 120 is serviced, at least in part, by network 150. Network 150 may be any network that facilitates wireless communications, may also include wired communication capabilities, and may communicate with other wired and wireless networks. Any and all such networks are contemplated as within the present disclosure. Examples of such networks include telephony radio networks such as global system for mobile communication ("GSM") networks and code division multiple access ("CDMA") networks, wireless computer networks such as Wi-Fi and IEEE 802.11 networks, and wired networks such as local area networks ("LANs"), wide area networks ("WANs"), intranets, and the Internet. Network 150 represents any possible combination of such networks, including a wireless network that may connect to the Internet and communicate with other devices that are connected, directly or indirectly, to the Internet. An example of such a device is server 160, which is part of automobile accident claims initiation system 170 and capable of communicating with mobile device 120 over network 150.

Once an accident has occurred, insured 110 may wish to begin the claims process. In one embodiment, insured 110 may operate mobile device 120 to communicate claims data to insurer claim system 170. Insurer claim system 170 may be one component of an automobile accident claims initiation system. Insurer claim system 170 may be any system that receives and/or processes claim data, and may be entirely automated, containing one or more computing devices such as server 160. Alternatively, insurer claim system 170 may include human operators interacting with computing devices. Any system that is capable of receiving and/or processing insurance claim data is contemplated as within the scope of the present disclosure.

Mobile device 120 may have installed on it, or otherwise configured with, an automobile accident claims initiation application to assist in the collection of claims data. The automobile accident claims initiation application may be one component of an automobile accident claims initiation system. Such an application may be a software program, and may communicate, automatically or on activation by insured 110, with insurer claim system 170. In another embodiment, such an application may be activated by the detection of an automobile accident through any means known to those skilled in the art. For example, in one embodiment mobile device 120 may be in communication with devices within or attached to vehicle 130, and the application may be activated when the mobile device detects an airbag activation via a communication with such devices. Any other means of detecting an accident or other insurance claim related activity or occurrence may be used to activate such an application, and all such means are contemplated as within the scope of the present disclosure.

In one embodiment, an automobile accident claims initiation application may be completely contained within insurer claim system 170, and may communicate with mobile device 120 in order to gather claim data. In yet another alternative, components or portions of an automobile accident claims initiation application may be installed on both mobile device 120 and on a device or devices in insurer claim system 170. Any such application that is capable of assisting in the collection of insurance claim data is contemplated as within the scope of the present disclosure. Any reference made in the present disclosure in regard to communication or interaction with insurer claim system 170 may include interacting, directly or indirectly, with an automobile accident claims initiation application.

In one embodiment, insured 110 may activate an automobile accident claims initiation application using mobile device 120. This activation may be the results of manipulating a dedicated button or input on mobile device 120, or of manipulating an input which may also be used for providing input to other applications. Such an input may be an icon, hyperlink, physical button, virtual button, or any other input which may be displayed on or otherwise integrated into mobile device 120. Such an input may also be a button, hyperlink, or other input displayed upon a webpage that is displayed on mobile device 120. In another embodiment, such an input may be a hyperlink, button, or other input that is displayed on or otherwise accessible through an email, text message, instant message, or other communication that is received, displayed, and/or available on mobile device 120.

The activation may also result from interaction with software on mobile device 120, such as selecting a menu item for automobile accident claims initiation application activation. All such inputs, and any other effective means of input known to those skilled in the art, are contemplated as within the scope of the present disclosure.

In another embodiment, insured 110 may send a request to initiate a claim to insurer claim system 170. Such a request may be sent as a transmission from mobile device 120, such as a text message, email, application-specific communication, or any other type of electronic communication. Means and methods of transmitting data from one device to another are well known to those skilled in the art and will not be recited herein. All such means and methods are contemplated as within the scope of the present disclosure. Such a request may be received on a device associated with insurer claim system 170, such as server 160, or any other device capable of receiving a request for the initiation of an insurance claim.

The request sent to insurer claim system 170 may include information that is preconfigured on mobile device 120. To facilitate the creation of claims in stressful situations, insured 110, the insurer, the provider of mobile device 120, or some other capable person or system, may have configured mobile device 120 to contain information relevant to insured 110 and/or insured 110's insurance policy. For example, mobile device 120 may be configured with insured 110's name, address, phone number, email address, policy number, insurer identification information, vehicle descriptions, or any other information that may be of use in initiating an insurance claim. All such information is contemplated as within the scope of the present disclosure.

In another embodiment, insurer claim system 170 may use one or several pieces of information provided within the request to derive or otherwise obtain insurance claim data. For example, the insured's 110 phone number may be provided in the request, and insurer claim system 170 may use that number to obtain other relevant information about insured 110 which insurer claim system 170 can then use to initiate an insurance claim. In one alternative, insurer claim system 170 may request confirmation that insured 110 is the subject of the claim before proceeding using means known to those skilled in the art. In another alternative, if mobile device 120 does not contain a phone number or other information associated with insured 110, the insurer claim system 170 may send one or more requests to insured 110 through mobile device 120 for identifying information about insured 110 that may be used to initiate an insurance claim. Any other pieces of information which may be used to locate or otherwise obtain further information about insured 110, and any other means of communicating confirmation or requesting information, may be used and all such means are contemplated as within the scope of the present disclosure.

The request sent to insurer claim system 170 may also include information that is acquired or generated by mobile device 120 which may useful in an insurance claim. For example, mobile device 120 may generate location information, such as GPS coordinates. Mobile device 120 may also generate time and date information. Any information that can be automatically obtained and/or generated by mobile device 120 may be included and is contemplated as within the scope of the present disclosure. This information may be useful to insurer claim system 170 in initiating or processing a claim. It may also be helpful to insured 110 to have as much information automatically provided to insurer claim system 170, thereby relieving some of the burden on insured 110.

Once a request to initiate a claim is received by insurer claim system 170, insurer claim system 170 determines if further information is needed or desirable. If insurer claim system 170 determines that no further information is needed or desired, insurer claim system 170 may create the claim and provide a final response to insured 110. The final response may be sent to mobile device 120, and may be of any type of final response as discussed in more detail herein. There may be situations where the request for claim initiation is the only information required by insurer claim system 170 to initiate a claim. For example, if the request includes insured's 110 name and policy number, and no further information is needed to initiate the claim, then insurer claim system 170 may respond with a claim number. Insurer claim system 170 may obtain further information later if it is desired.

In one embodiment, mobile device's 120 phone number may be associated with the claim number. Insurer claim system 170 may use the phone number as detected in an incoming call to associate future calls from mobile device 120 with the claim, and automatically route such calls to an appropriate contact. In one embodiment, insurer claim system 170 may request verification from the user of mobile device 120 when mobile device 120 is used to call insurer claim system 170, thereby ensuring that the user of mobile device 120 is an authorized party. Any form of verification known to those skilled in the art may be employed. All such means of correlating information identifying mobile device 120 with an insurance claim are contemplated as within the scope of the present disclosure.

Alternatively, it is contemplated that insurer claim system 170 and/or insured 110 may wish to gather more information relating to the claim shortly after the request to initiate the claim is received at insurer claim system 170. In one embodiment, an inquiry is sent to mobile device 120 from insurer claim system 170 requesting further information about the accident and/or claim request. For example, if not provided by data preconfigured on mobile device 120, a request may be sent asking for insured's 110 name, policy number, address, phone number, license plate number, or any other claimant identifying information that may be used by insurer claim system 170. Insurer claim system 170 may use any such identifying information to locate policy information for insured 110.

In another example, a request may be sent to mobile device 120 requesting information on other cars and/or drivers involved in the accident. Such a request may include a request for driver's 145 driver's license number, name, address, telephone number, license plate number, or any other driver identifying data. Alternatively, such a request may ask for vehicle's 140 license plate number, make, model, year of manufacture, color, or any other vehicle identifying information. In yet another alternative, such a request may ask for other information relating to the accident, such as location, address, time of day, weather and/or traffic conditions, police report number, or any other useful information. In yet another alternative, information about witnesses may be requested, such as witness names, phone numbers, addresses, and any other witness identifying information. All such information, and any other information or data that may be useful in initiating or processing an insurance claim, may be requested and is contemplated as within the scope of the present disclosure.

It is contemplated that a request from an insurer may also be presented as an option on mobile device 120, in one embodiment configured in an application, for insured 110 to provide data to insurer claim system 170. For example, an application that operates as a component of an automobile accident claims initiation system may provide options for insured 110 to provide claim related data without further prompting. Such options may be provided by any means known to those skilled in the art, and may include menu options and actual or virtual buttons. Any means of providing options to insured 110 on mobile device 120, and any options which may be employed to gather claim data, are contemplated as within the scope of the present disclosure.

In another embodiment, a request is sent to mobile device 120 from insurer claim system 170 requesting further information about the accident and/or claim request in the form of images. Such images may be acquired by insured 110 by operating a camera component of mobile device 120. Such image may be stored on mobile device 120. For example, a request may be made for one or more images of the accident scene, the vehicles involved, or the drivers and witnesses. In one alternative, a request is made for an image of the license plate of one or more vehicles involved, such as vehicle 140. Such an image may be used by insurer claim system 170 to record the license plate number of vehicle 140, or to determine the ownership, registration status, make, model, and/or year of manufacture of vehicle 140. Such images may be useful in initiating an insurance claim, and may prove helpful later in determining fault, evaluating the cause of the accident, determining the weather and/or traffic conditions, or providing any other useful information.

In yet another embodiment, a request is sent to mobile device 120 from insurer claim system 170 for audio data. Such audio data may be acquired by insured 110 by operating an audio component of mobile device 120, and such audio data may be stored on mobile device 120. For example, statements of witnesses may be requested in the form of audio data. Alternatively, statements of insured 110, or of driver 145 may be requests. Audio data of any other person or any other audio data may be requested, and all such audio data is contemplated as within the scope of the present disclosure.

In another embodiment, statements are collected in response to text prompts provided through mobile device 120, such as text messages. For example, insurer claim system 170 may send a request for a statement to mobile device 120, and then may proceed to send questions to mobile device 120. Insured 110 may provide audio responses to these questions using mobile device 120, which may be directly transmitted to insurer claim system 170, or which may be stored on mobile device 120 for later transmission to insurer claim system 170. Any other means of querying insured 110 or any other party, and any means of collecting responses to such queries, as contemplated as within the scope of the present disclosure.

Any other form or type of data may be requested by insurer claim system 170, and all such requests are contemplated as within the scope of the present disclosure.

Insured 110 may respond to the request by acquiring the responsive data. For example, insured 110 may enter text into mobile device 120, may acquire images using a camera component of mobile device 120, may acquire audio data by activating an audio component of mobile device 120, or may take any other actions the may acquire the requested data. All such actions are contemplated as within the scope of the present disclosure.

Once acquired, insured 110 may send the responsive data to insurer claim system 170. In one embodiment, the collected data may be transmitted to insurer claim system 170, or a component of insurer claim system 170 such as server 160, from mobile device 120, over a network or combination of networks, such as network 150. The transmission of the data may be performed when insured 110 operates mobile device 120 such that the transmission is initiated. Alternatively, a data collection application contained in mobile device 120 may automatically transmit data to a remote system for analysis. Means and methods of transmitting data from one device to another are well known to those skilled in the art and will not be recited herein. All such means and methods are contemplated as within the scope of the present disclosure.

In one embodiment, additional data is transmitted to insurer claim system 170. Such additional data may include data provided by or obtained from mobile device 120 itself, such as time, date, and location information as described herein. Such additional data may also include information entered into, or otherwise configured on, mobile device 120 relating to insured 110 as described herein, such as insured's 110 name, address, telephone number, insurance policy number, email address, or any other information associated with insured 110. This data may be used by insurer claim system 170 in the initiation or processing of the claim. For example, images may be analyzed in conjunction with GPS coordinates associated with the image. Such coordinates may be stored with the image, along with a timestamp, to identify a location where the image was acquired and the time of acquisition. Such information may be useful for providing or acquiring further information that is time or proximity sensitive for the processing of the claim.

When a response is received at insurer claim system 170, the response may be analyzed. For example, insured's 110 name and address may be analyzed to determine if insured 110 has an active policy with the operator of insurer claim system 170. Alternatively, such analysis may be more sophisticated. For example, an image of the license plate of vehicle 140 may be analyzed, in one embodiment using character recognition software, to derive the license plate number contained thereon. The derived license plate number may be further analyzed to determine the owner and registration status of vehicle 140. Such analysis may reveal whether vehicle 140 is current on inspections, is stolen, or may have other registration or licensing problems. In yet another alternative, information about driver 145 may be analyzed to determine if it is authentic. This may be especially useful in preventing fraud. For example, if driver 145 provides false identity information, receiving the results of the analysis of such information while at the scene of the accident may enable insured 110 to notify any authorities that may be present, such as the police. This may prevent driver 145 from leaving the scene and furthering a fraud.

Such analysis may also include taking actions which may facilitate the processing of the claim or assist in recovery from the accident. For example, after receiving accident location information, insurer claim system 170 may contact a tow truck company and arrange for vehicle 130 to be towed. Insurer claim system 170 may also notify a repair shop to expect vehicle 130 for repair. Alternatively, if insurer claim system 170 was the first contact made by insured 110, insurer claim system 170 may notify the proper authorities on behalf of insured 110, such as calling an ambulance or the police. Insurer claim system 170 may transmit insurance claim data to relevant authorities, such as the police. All other such actions are contemplated as within the scope of the present disclosure.

Analysis of responses and associated data may be entirely performed automatically by one or more computers or other devices, or the analysis may be performed in whole or in part by humans. Here again, means and methods of analyzing data are well known to those skilled in the art and will not be recited herein. All such means and methods are contemplated as within the scope of the present disclosure.

In an alternative embodiment, analysis of provided data is performed on mobile device 120. This may be accomplished through the use of one or more software applications or programs installed, configured, or otherwise operable and/or accessible on mobile device 120. Analysis on mobile device 120 may also be accomplished in conjunction with communication by mobile device 120 with other devices. Such communication may occur over a network or combination of networks such as network 150. Any analysis of data described herein, including analysis described in relation to insurer claim system 170, or a remote device such as server 160, may be performed on mobile device 120, and all such analysis is contemplated as within the scope of the present disclosure.

In another embodiment, an application on mobile device 120 requests any of the data described herein and stores the collected data on mobile device 120. Such data is then transmitted to insurer claim system 170 all at once, rather than transmitting each response to insurer claim system 170 as it is received on mobile device 120.

After any analysis of a response provided by insured 110, insurer claim system 170 may determine whether further information is needed or desirable. If so, then insurer claim system 170 may send another request for information to mobile device 120, which may be of any type or form as described herein. And again, a response may be provided to insurer claim system 170 by insured 110 through the operation of mobile device 120. This process may continue until insurer claim system 170 determines that no other information is required or desired to initiate or further process a claim.

If no further information is requested by insurer claim system 170, insurer claim system 170 may then provide claim information to insured 110 through mobile device 120. Such claim information may include a claim number, a telephone number that may be used to follow-up on the claim, an insurance representative's or agent's name and contact information, rental car agency information, repair shop information, and any other information that may be useful and may be related to the accident or the claim resulting therefrom. All such information is contemplated as within the scope of the present disclosure.

In one embodiment, insured 110 may operate mobile device 120 such that a request is sent to insurer claim system 170 for human assistance. Such a request may be detected as the selection of an option available through an application configured on mobile device 120. Alternatively, insured 110 may request human assistance through a communication from mobile device 120 such as a text message, email, voice call, or any other form of communication. This option may be available so that insured 110 can get assistance with issues that are not addressed by the automated features of an automobile accident claims initiation system.

Alternatively, an automobile accident claims initiation system may initiate a voice call to mobile device 120. Such a call may be initiated in response to data provided by insured 110 through mobile device 120. For example, if data provided indicates that there are serious injuries resulting from the accident, insurer claim system 170 may connect insured 110 to a human operator to assist. Alternatively, data provided by insured 110 may indicate a particular insurance status or reflect preferences of insured 110 for human assisted claim initiation. Any such conditions or circumstances where a voice call may be connected during the operation of an automobile accident claims initiation system are contemplated as within the scope of the present disclosure.

Figure 2:
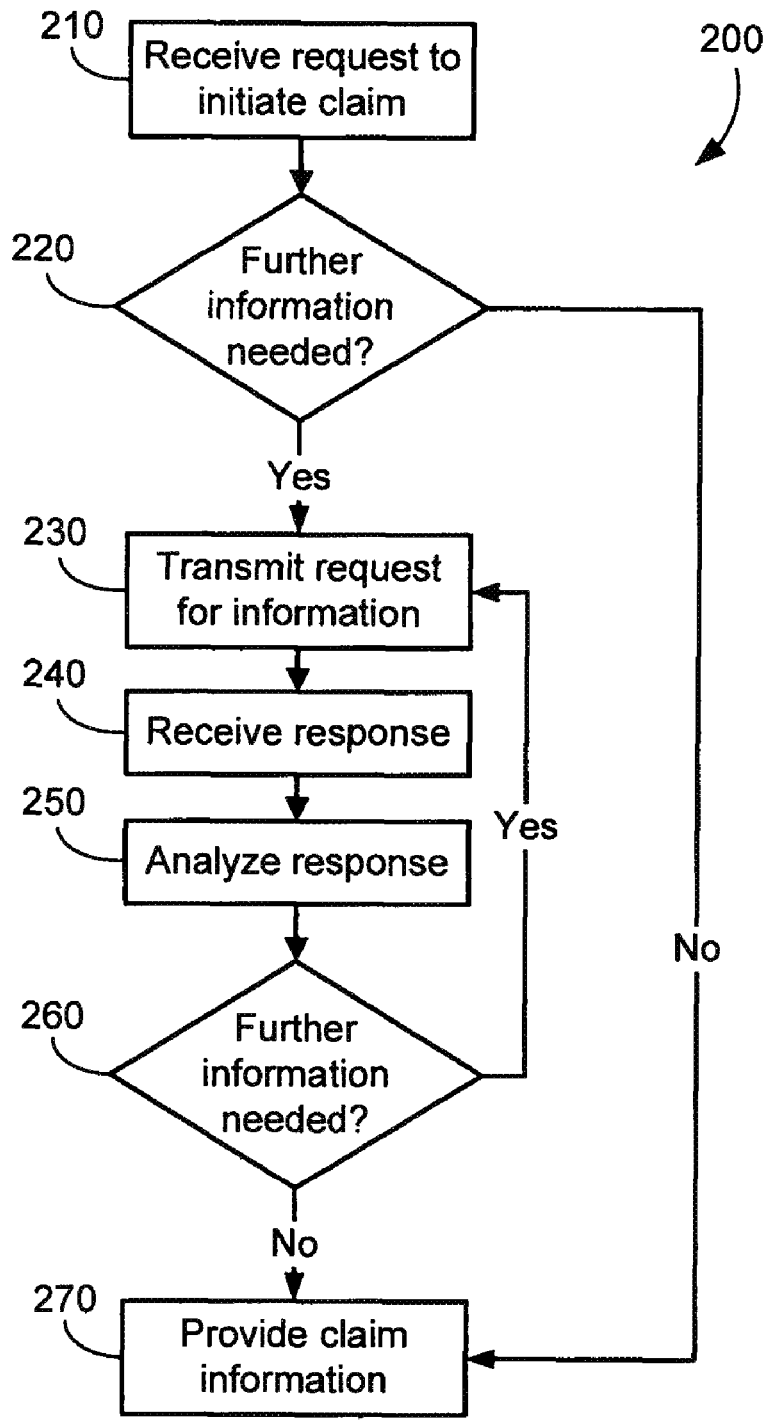
FIG. 2 is a flow diagram of an exemplary, non-limiting method of operating an automobile accident claims initiation system.

FIG. 2 illustrates a non-limiting, exemplary method 200 of implementing the present subject matter. At block 210 a request to initiate a claim is received by a automobile accident claims initiation system. Such a request may be received on a mobile device and transmitted to a remote device, or a request may be received on an application residing on a mobile device, where the application is a component of the automobile accident claims initiation system.

At block 220, a determination is made as to whether any further information is needed or desired to initiate or process a claim. If no further information is needed, the method progresses to block 270. No further information may be needed in circumstances where a mobile device and/or a automobile accident claims initiation application configured on a mobile device is preconfigured with insured data, such as the name, address, and policy number of an insured. An automobile accident claims initiation system may be capable of initiating a claim using only such information.

If at block 220 it is determined that further information would be desirable or required, then at block 230, an automobile accident claims initiation system may send a request for further information to an insured. This may be simply presenting a message on a mobile device requesting information or providing instructions on how to acquire information. Alternatively, this may be a text message or email sent to a mobile device which requests further data. Any such request may be transmitted to a mobile device operated by an insured, or may be provided through an application configured on such a mobile device. Any request such as those described herein in regard to FIG. 1, or any other request which may solicit information useful in initiating or processing a claim may be made and is contemplated as within the scope of the present disclosure.

At block 240, a response to the request provided at block 230 is received by an automobile accident claims initiation system. Such a response may be the entry of text or selection of an input on a mobile device which is detected by an application configured on the mobile device. Alternatively, a response maybe transmitted to an automobile accident claims initiation system from a mobile device in the form of a text message, email, or any other form of electronic communication. The response may include image or audio data as described herein. The response may also include data preconfigured on a mobile device as described herein. Any such response, and any other form or type of a response that may be used in initiating or processing an insurance claim is contemplated as within the scope of the present disclosure.

At block 250, the response received at block 240 is analyzed. Such analysis may be of any type as described herein, including, but not limited to, deriving a license plate number from an image of a license plate and determining registration, ownership, or other information from the license plate number. Such analysis may also include evaluating a driver's information to determine if it is legitimate. Such analysis may also include transcribing, via computer, machine, or by human, audio data that has been collected at the scene of an accident. Any other analysis that may be of use in claim initiation or processing is contemplated as within the scope of the present disclosure.

At block 260, a determination is made as to whether any further information may be needed or desired in relation to the initiation or processing of a claim. If further information may be useful, the method returns to block 230, and another transmission of a request for information is performed. If no other information is to be requested, then at block 270 claim information is provided to an insured. Such information may be transmitted to a mobile device operated by the insured. Such information may be duplicated and sent to alternative destinations. For example, claim information may be sent via letter to the insured's address, or sent via email to the insured's email account. Claim information may include a claim number, a statement of policy coverage, a description of the claim, information relating to repair shops and car rental agencies, copies or summaries of witness statements, police report numbers, or any other information that an insurer or an insured may associate with an insurance claim. All such information is contemplated as within the scope of the present disclosure.

Interaction between the automobile accident claims initiation system and the insured may take any effective form. In one embodiment, claim initiation is provided through software installed or otherwise configured on a mobile device, which, through the mobile device, communicates with a automobile accident claims initiation system. Alternatively, the application on the mobile device may perform all the activities of initiating a claim without communication with other devices. The interaction may occur using any means known to those skilled in the art, including menu driven and text-based interaction. In another embodiment, interaction is provided through a voice conversation held over a voice connection between a mobile device operated by the purchaser and a telephone operated by an operator of an automobile accident claims initiation system. Any other means or methods of interaction in providing claim initiation are contemplated as within the scope of the present disclosure.

Figure 3:
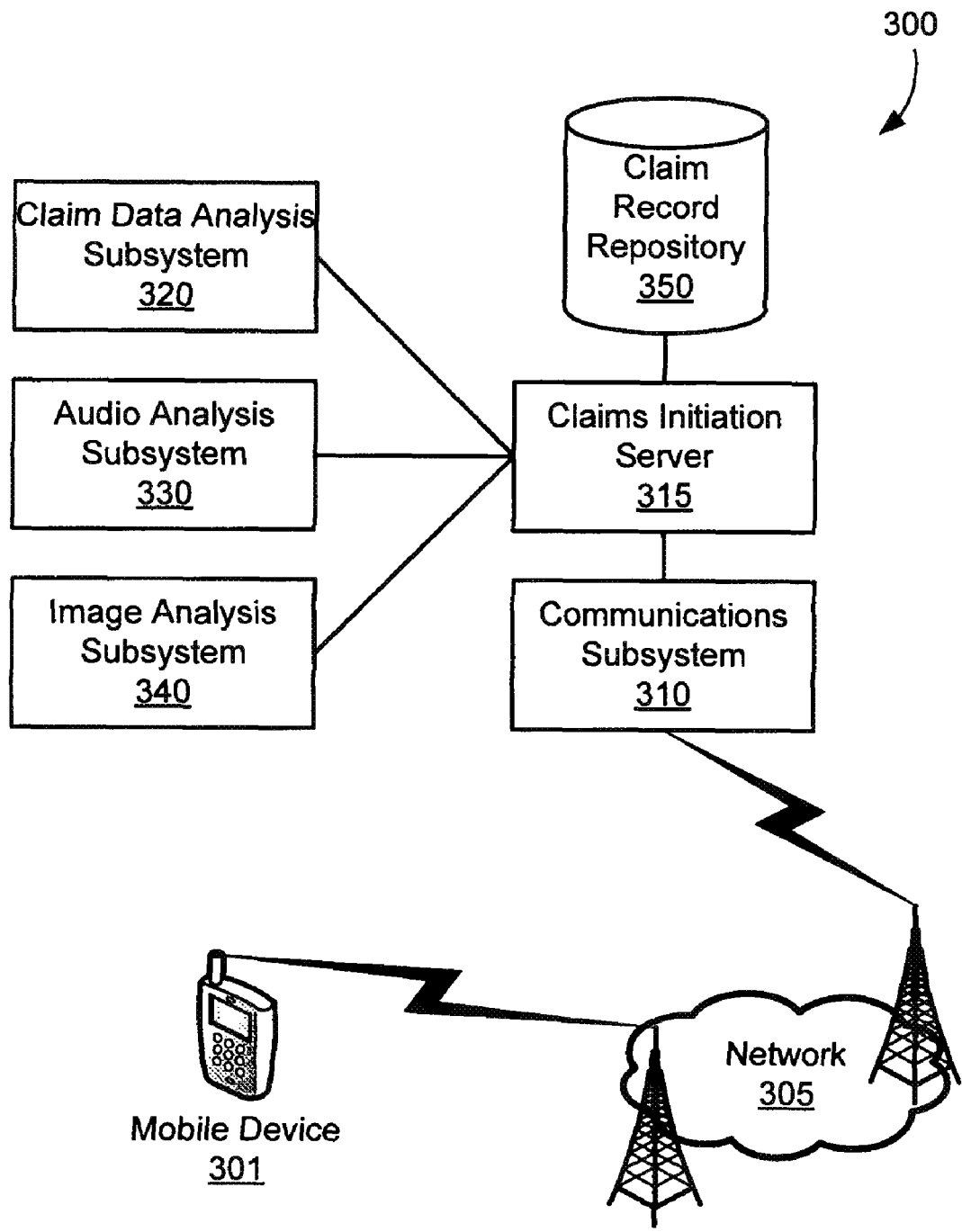
FIG. 3 is an exemplary and non-limiting embodiment of an automobile accident claims initiation system.

FIG. 3 illustrates an exemplary, non-limiting automobile accident claims initiation system 300. Mobile device 301 may be a device operated by an insured to request initiation of an insurance claim, collect and provide data for an insurer, and/or provide requests for information to an insured. Mobile device 301 may perform any of the functions of a mobile device described in relation to FIGS. 1 and 2, or any other function capable of being performed on a mobile device as described herein. Mobile device 301 may communicate with network 305, which may be any network or combination of networks as described herein, and may facilitate communication with automobile accident claims initiation system 300.

Using network 305, mobile device 301 may communicate with communications subsystem 310 of automobile accident claims initiation system 300. Communications subsystem 310 may be any component or combination of components that facilitates communication with other devices, such as mobile device 301. The communication between mobile device 301 and communications subsystem 310 may be of any form described herein or any other effective form of communication. Communications subsystem 310 may communicate with claims initiation server 315. Claims initiation server 315 may provided requests for information to communications subsystem 310, which then may transmit such requests to mobile device 301. responses to such requests may then be sent from mobile device 301 to communications subsystem 310, which may then convey the responses to claims initiation server 315.

Claims initiation server 315 may be any computing device or combination of devices and/or humans capable of initiating and/or processing insurance claims. Claims initiation server 315 may be configured to follow a rules-based process to capture claim data from data provided by mobile device 301. For example, claims initiation server 315 may send a request to mobile device 301 for a policy number, in one embodiment through communications subsystem 310. Upon receiving a response, claims initiation server 315 may determine the next request which may be sent to mobile device 301. In another embodiment, claims initiation server 315 may analyze an image of a license plate, either directly or through the us of a subsystem, and determine a license plate number. Claims initiation server 315 may determine that the vehicle associated with the license plate number is stolen, and then send a communication to mobile device 301 with that information. Any other rules-based processing that may be performed in relation to insurance claims initiation and processing is contemplated as within the scope of the present disclosure.

Claims initiation server 315 may operate in cooperation with subsystems that perform specific tasks. In one embodiment claims initiation server 315 operates with claim data analysis subsystem 320, which may analyze claim data as described herein. For example, claim data analysis subsystem 320 may analyze the driver's license number and name of a reported driver to determine if that driver is in fact who the driver is claiming to be. Alternatively, claim data analysis subsystem 320 may analyze a license plate number of a vehicle involved in an accident to determine if the vehicle is registered properly. In yet another embodiment, claim data analysis subsystem 320 may receive GPS coordinates of a mobile device and determine an address, intersection, or any other useful location information based on the GPS coordinates. Such data may be used to provide an analyst with maps, including satellite maps showing the actual area. Any such analyzed data may then be associated or stored with a claim as claim data. Any other analysis is contemplated, and may be useful to the insured while the insured is at the scene of an accident.

Specific subsystems may be dedicated to specific types of data. In one embodiment, audio analysis subsystem 330 may receive audio data and analyze such data. For example, audio analysis subsystem 330 may receive audio data of witness interviews obtained with mobile device 301 at the scene of an accident and transcribe the audio data using methods and means known to those skilled in the art. The resulting transcriptions may be stored as part of a claim. Any other processing of audio data may be performed by one or more audio analysis subsystems 330, and all such processing is contemplated as within the scope of the present disclosure.

In another embodiment, image analysis subsystem 340 may analyze and process image data. For example, an image of a vehicle license plate may be received by image analysis subsystem 340, which may utilize character recognition means and methods known to those skilled in the art to derive a license plate number from the image. The derived license plate number may then be analyzed by image analysis subsystem 340, communicated to claim data analysis subsystem 320 or claims initiation server 315 for analysis, or analyzed, processed, or stored in any other effective way. In another exemplary embodiment, images of vehicle damage may be received by image analysis subsystem 340, and such images may be analyzed to determine the extent of damage or to determine an estimate of cost for repair. The results of such analysis may be stored or associate with a claim. Any other analysis or processing of image data is contemplated as within the scope of the present disclosure. Claim data may be stored in claim record repository 350, which may also store other claim related data and information.

Other subsystems and repositories may be configured in automobile accident claims initiation system 300 to process other types of data or to perform analysis of any form of data described herein. Any of the systems, subsystems, and repositories illustrated in FIG. 3 may be components of a single computing system or may be individual computing, processing, or storage devices that may be communicatively connected to other devices. Any of these systems, subsystems, and repositories may be owned and/or operated by an individual, entity, business, or any combination thereof for the purposes of initiating and/or processing insurance claims. All such configurations and operations are contemplated as within the scope of the present disclosure.

While example embodiments of an automobile accident claims initiation system have been described in connection with various computing devices, the underlying concepts may be applied to and implemented, in part or whole, in any computing device or system capable of implementing an automobile accident claims initiation system as disclosed herein. The various techniques described herein may be implemented in connection with hardware or software or, where appropriate, with a combination of both. Thus, the systems and methods for implementing an automobile accident claims initiation system, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing an automobile accident claims initiation system. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for an automobile accident claims initiation system may also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device ("PLD"), a client computer, or the like, the machine becomes an apparatus for implementing an automobile accident claims initiation system. When implemented on a general-purpose processor, the program code combines with the processor to provide a unique apparatus that operates to invoke the functionality of an automobile accident claims initiation system. Additionally, any storage techniques used in connection with an automobile accident claims initiation system can invariably be a combination of hardware and software.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment but rather should be construed in breadth and scope in accordance with the appended claims.

What is claimed is:

1. A method of initiating an insurance claim for an accident involving an insured person and an adverse party, the initiating being in response to a user operating a mobile device, comprising:
    receiving user input on the mobile device, the user input comprising claim data;
    automatically storing the claim data on the mobile device;
    receiving claim initiation input on the mobile device;
    automatically transmitting the claim data from the mobile device to an insurer;
    receiving a claim identifier from the insurer on the mobile device;
    receiving on the mobile device, a request for an identity of the adverse party;
    transmitting the identity of the adverse party to the claim; and
    receiving and presenting on the mobile device a notification indicating whether the identity of the adverse party is authentic, wherein the identity was analyzed and authenticated by a claim data analysis subsystem.

2. The method of claim 1, further comprising:
    receiving an insurer inquiry from the insurer on the mobile device; and
    responsive to the insurer inquiry, automatically presenting the insurer inquiry on a mobile device display.

3. The method of claim 1, wherein automatically transmitting the claim data from the mobile device to an insurer further comprises:
    collecting location data automatically on the mobile device; and
    transmitting the location data to the insurer.

4. The method of claim 3, wherein the location data comprises global positioning system data.

5. The method of claim 1, wherein automatically transmitting the claim data from the mobile device to an insurer further comprises:
    collecting timestamp data automatically on the mobile device; and
    transmitting the timestamp data to the insurer.

6. The method of claim 1, further comprising automatically initiating a voice call on the mobile device to the insurer.

7. The method of claim 1, further comprising:
    receiving an insurer inquiry from the insurer on the mobile device; and
    responsive to the insurer inquiry, automatically presenting the insurer inquiry on a mobile device display;
    wherein automatically transmitting the claim data from the mobile device to an insurer further comprises:
        collecting location data automatically on the mobile device, wherein the location data comprises global positioning system data;
        collecting timestamp data automatically on the mobile device; and
        transmitting the location data and the timestamp data to the insurer.

8. A system for initiating an insurance claim for an accident involving an insured person and an adverse party, the initiating being in response to a user operating a mobile device, comprising:
    a processor; and
    a memory, the memory including instructions, which when executed by the processor, cause the processor to implement at least one subsystem that:
        receives user input on the mobile device, the user input comprising claim data;
        automatically stores the claim data on the mobile device;
        receives claim initiation input on the mobile device;
        automatically transmits the claim data from the mobile device to an insurer;
        receives a claim identifier from the insurer on the mobile device;
        receives a request for an identity of the adverse party;
        transmit the identity of the adverse party to the claim; and
        receive and present on the mobile device a notification indicating whether the identity of the adverse party is authentic, wherein the identity was analyzed and authenticated by a claim data analysis subsystem.

9. The system of claim 8, wherein the memory further comprises instructions, which when executed by the processor, cause the processor to implement a subsystem that:

receives an insurer inquiry from the insurer on the mobile device; and responsive to the insurer inquiry, automatically presents the insurer inquiry on a mobile device display.

10. The system of claim 8, wherein the subsystem that automatically transmits the claim data from the mobile device to an insurer:

collects location data automatically on the mobile device; and transmits the location data to the insurer.

11. The system of claim 10, wherein the location data comprises global positioning system data.

12. The system of claim 8, wherein the subsystem that automatically transmits the claim data from the mobile device to an insurer:

collects timestamp data automatically on the mobile device; and transmits the timestamp data to the insurer.

13. The system of claim 8, wherein the memory further comprises instructions, which when executed by the processor, cause the processor to implement a subsystem that automatically initiates a voice call on the mobile device to the insurer.

14. The system of claim 8, wherein the memory further comprises instructions, which when executed by the processor, cause the processor to implement a subsystem that:

receives an insurer inquiry from the insurer on the mobile device; and responsive to the insurer inquiry, automatically presents the insurer inquiry on a mobile device display;

wherein the at least one subsystem that automatically transmits the claim data from the mobile device to an insurer further comprises at least one subsystem that:

collects location data automatically on the mobile device, wherein the location data comprises global positioning system data;

collects timestamp data automatically on the mobile device; and transmits the location data and the timestamp data to the insurer.

15. A computer-readable storage medium comprising computer-readable instructions for initiating an insurance claim for an accident involving an insured person and an adverse party, the initiating being in response to a user operating a mobile device, the computer-readable instructions comprising instructions for:

receiving user input on the mobile device, the user input comprising claim data;

automatically storing the claim data on the mobile device;

receiving claim initiation input on the mobile device;

automatically transmitting the claim data from the mobile device to an insurer;

receiving a claim identifier from the insurer on the mobile device;

receiving on the mobile device, a request for an identity of the adverse party;

transmitting the identity of the adverse party to the claim; and receiving and presenting on the mobile device a notification indicating whether the identity of the adverse party is authentic, wherein the identity was analyzed and authenticated by a claim data analysis subsystem.

16. The computer-readable storage medium of claim 15, further comprising instructions for:

receiving an insurer inquiry from the insurer on the mobile device; and responsive to the insurer inquiry, automatically presenting the insurer inquiry on a mobile device display.

17. The computer-readable storage medium of claim 15, wherein the instructions for automatically transmitting the claim data from the mobile device to an insurer further comprise instructions for:

collecting location data automatically on the mobile device; and transmitting the location data to the insurer.

18. The computer-readable storage medium of claim 17, wherein the location data comprises global positioning system data.

19. The computer-readable storage medium of claim 15, wherein the instructions for automatically transmitting the claim data from the mobile device to an insurer further comprise instructions for:

collecting timestamp data automatically on the mobile device; and transmitting the timestamp data to the insurer.

20. The computer-readable storage medium of claim 15, further comprising instructions for automatically initiating a voice call on the mobile device to the insurer.

21. The computer-readable storage medium of claim 15, further comprising instructions for:

receiving an insurer inquiry from the insurer on the mobile device; and responsive to the insurer inquiry, automatically presenting the insurer inquiry on a mobile device display;

wherein the instructions for automatically transmitting the claim data from the mobile device to an insurer further comprises instructions for:

collecting location data automatically on the mobile device, wherein the location data comprises global positioning system data;

collecting timestamp data automatically on the mobile device; and transmitting the location data and the timestamp data to the insurer.

* * * * *